Jan. 31, 1956    D. M. BEARD ET AL    2,732,779
LIGHT TRAP FOR DARKROOM
Filed July 11, 1952    3 Sheets-Sheet 1

INVENTORS
DONALD M. BEARD
FRANK H. WILDUNG
PETER P. BRUCE

BY

ATTORNEYS

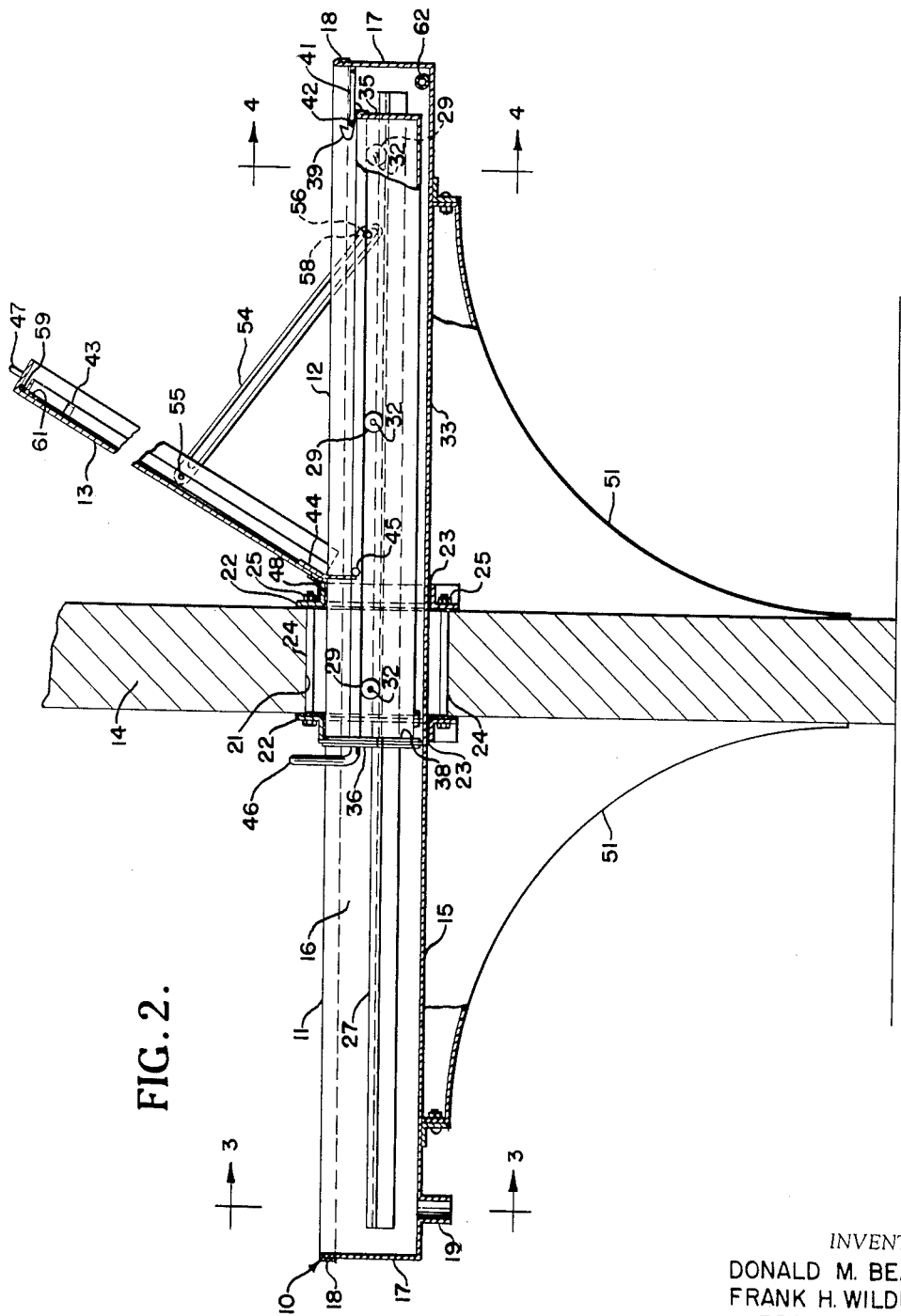

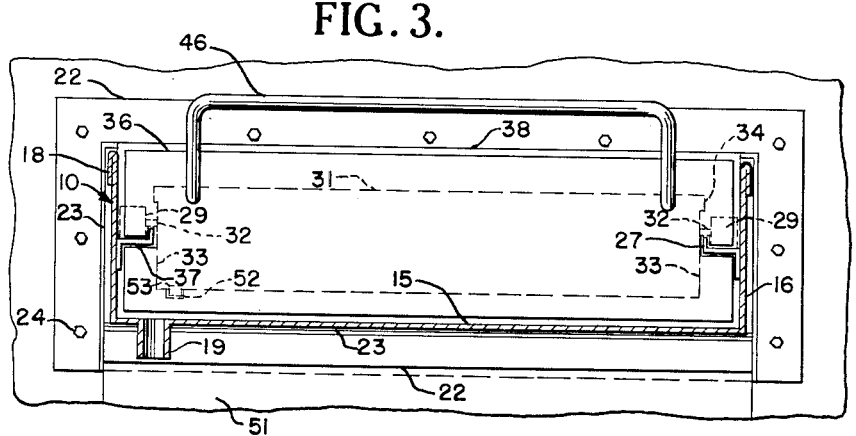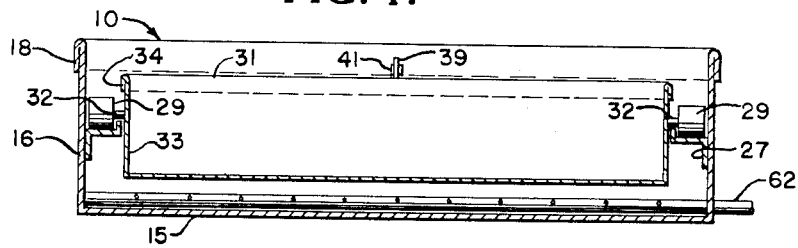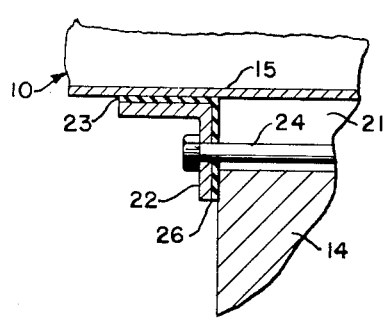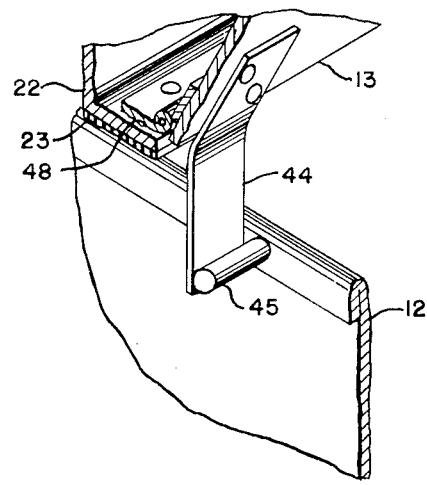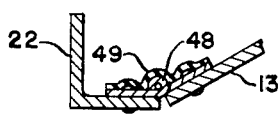

United States Patent Office 2,732,779
Patented Jan. 31, 1956

2,732,779

LIGHT TRAP FOR DARKROOM

Donald M. Beard, Spencerville, Md., Frank H. Wildung, Washington, D. C., and Peter P. Bruce, Tyrone, Pa.

Application July 11, 1952, Serial No. 298,488

6 Claims. (Cl. 95—90)

(Granted under Title 35, U. S. Code (1952), sec. 266)

The invention described herein may be manufactured and used by or for the Government of the United States of America for governmental purposes without the payment of any royalties thereon or therefor.

The present invention relates to light traps for darkrooms, more particularly the invention relates to apparatus for maintaining a darkroom for photographic developing in light-tight condition while photographic prints and other products of the darkroom are passed to the exterior thereof or vice versa.

The device of the present invention provides a tray mounted on tracks and adapted to convey photographic prints and the like from the darkroom through a wall thereof and into an exteriorly mounted light-tight casing. When the tray has been moved into the casing a light-tight seal is formed at the rear wall of the tray with the casing, thus sealing the darkroom against light when the lid of the casing is lifted to remove the prints. Locking devices are provided to prevent opening of the lid until the rear wall of the tray is in light-tight engagement and to prevent moving of the tray when the lid is in the raised position.

An object of the present invention is to provide a new and improved light trap and tray for a photographic darkroom which prevents accidental opening or operation to defeat the light excluding properties thereof.

Another object is to provide a new and improved light-trap and tray for a photographic darkroom which is simple, easy to operate, and ruggedly constructed.

A further object is to provide apparatus for transporting photographic prints from the interior of a darkroom to the exterior thereof without defeating the light-tight condition of the darkroom.

A still further object is to provide apparatus for transporting photographic prints from the interior of a darkroom to the exterior thereof and in which treatment of the prints may be continued.

Other objects and many of the attendant advantages of this invention will be readily appreciated as the same becomes better understood by reference to the following detailed description when considered in connection with the accompanying drawings wherein:

Fig. 2 is a view similar to Fig. 1 and showing the tray moved exteriorly of the darkroom and the lid of the casing raised;

Fig. 3 is a sectional view taken along the line 3—3 of Fig. 2;

Fig. 4 is a sectional view taken along the line 4—4 of Fig. 2;

Fig. 5 is a detail sectional view of a frame member;

Fig. 6 is a detail perspective view of the stop for preventing movement of tray when the lid is raised; and Fig. 7 is a sectional view of the hinge member of the casing lid.

Figure 1:
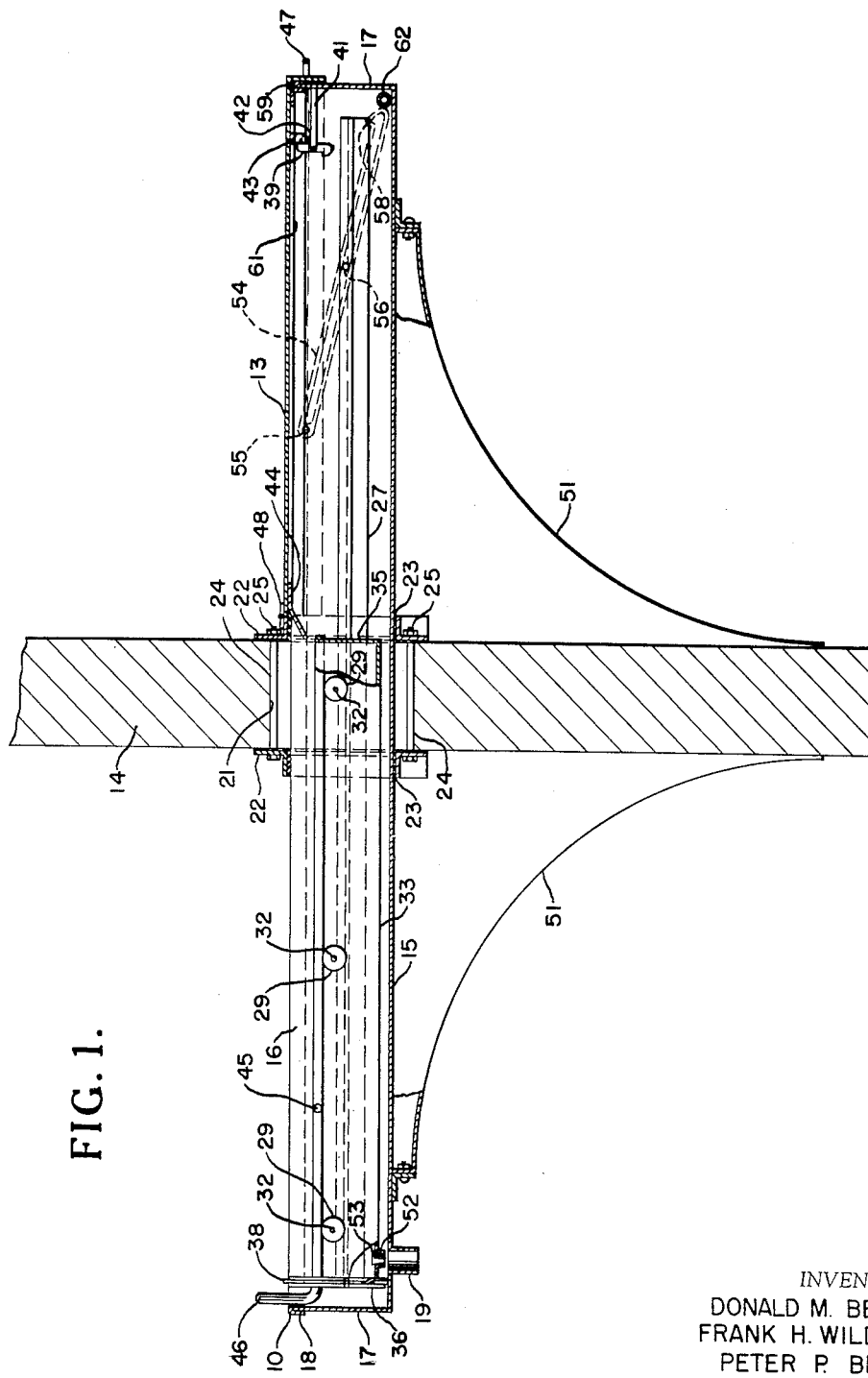
Fig. 1 is a longitudinal sectional view of the device of the present invention installed in a wall of a darkroom and showing the tray thereof positioned in the darkroom.

Referring more particularly to the drawings in which like numerals indicate like parts throughout the several views, 10 indicates generally a casing having an uncovered portion 11 and a covered portion 12, the cover or lid being indicated at 13. The uncovered portion 11 is positioned within a photographic dark room, while covered portion 12 is positioned in a room in which daylight or artificial light is present. Dividing the two rooms is a partition or wall 14.

Casing 10 comprises a bottom 15 having sides 16 and ends 17 struck up therefrom. If desired the upper edges of the sides and ends 16 and 17 may be folded over to provide a reinforced edge 18.

A drain opening 19 is provided at the darkroom end of casing 10 to drain off any liquids which may collect therein, the opening 19 being preferably positioned over one of the rinsing tanks of the darkroom.

The casing 10 passes through opening 21 in wall 14, a pair of angle-iron frames 22 being fitted to casing 10 on both sides of wall 14 in a light-tight manner, as by rubber gaskets 23. A plurality of bolts 24 are employed to clamp frames 22 against the wall 14, the bolts passing through the flanges of the frames and through opening 21 of the wall, it, of course, being understood that bolts 24 are fitted with nuts 25 as disclosed in the drawings. Gaskets 26 are interposed between frames 22 and the darkroom and outer faces of wall 14.

The inner faces of sides 16 are provided with flanged bars or tracks 27 which are secured to the sides by riveting as at 28 or, if desired, by spot welding. Bars 27 run substantially the length of casing 10 and form a trackway for rollers 29 of tray 31, rollers 29 being fastened to tray 31 by pins 32 which are welded or otherwise fastened to the sides 33 thereof.

Sides 33 are formed with reinforcing channels 34 at the top edges thereof. Tray 31 is also provided with an upturned end plate 35 at one end thereof and an enlarged end plate 36 at the other end thereof. End plate 36 is shaped at the bottom and sides to fit the interior conformation of casing 10 with a slight clearance therebetween. Cutouts 37 are formed in the side portions of end plate 36 to fit around tracks or bars 27. A rubber gasket 38 extends beyond the edges of end plate 36 and engages the inside surface of casing 15 and at the upper portion thereof the gasket engages frame 22 thus to form an effective light-tight seal between the darkroom and the lighted exterior room when lid 13 is raised.

In order to prevent opening of lid 13 while tray 31 is in other than the position indicated in Fig. 2 of the drawings, a latch 39 is provided. Latch 39 is secured to wall 17 of the covered portion 12 of casing 10 by supporting bars 41 and is urged to a vertical position by spring 42. An inspection of Fig. 1 shows latch member 39 engaging a keeper 43, which prevents opening or lifting of lid 13. When tray 31 is moved to the position of Fig. 2 the end wall or plate 35 engages the lower end of latch 39, disengaging latch 39 from keeper 43 thus freeing lid 13 for lifting, if desired.

When lid 13 is in the lifted position, stops 44 fastened to lid 13 engage pins 45 secured to sides 33 of tray thus preventing movement of tray 31 to break the light seal of gasket 38. When lid 13 is in the lowered position (Fig. 1) stops 44 are out of the path of pins 45, therefore tray 31 is free to move from the position of Fig. 2 to that of Fig. 1. In order that tray 31 may be conveniently moved a handle 46 is fastened to plate 36.

Lid 13 is provided with a handle 47 and is hinged to one of the frames 22 as at 48. If desired, the hinge 48 may be rendered light-tight by cementing a flexible sheet of opaque material over the hinge as shown at 49.

Rigid supporting structures 51 are fastened beneath casing 11 on both sides of wall 14 thus to firmly support the casing.

The tray 31 is provided with a drain opening 52 which is closed by a plug 53. It is, of course, understood that tray 31 normally contains water or other liquid into which the prints are placed for passing to the exterior of the darkroom, the drain opening 52 being for the purpose of draining such liquid from the tray.

Casing 11 also has, as aforementioned, the drain opening 19 which carries off any of the liquid which splashes over the sides of tray 31 during movement thereof and also the liquid which drains out of opening 19 when plug 53 is removed.

In order to maintain lid 13 in a raised position it is provided with a pair of slotted supports 54 which are pivotally supported on lid 13 as at 55 and slide on pins 56 fixed on the sides 16 of casing 10, slots 57 of supports 54 having shoulders 58 for resting against pins 56 thus to support lid 13 as is well-known in lid structures and as shown in Fig. 2.

The lid 13 is provided around the inner edges thereof with a rubber gasket 59 retained by an angle mounting frame 61. The purpose of the foregoing being to ensure exclusion of light from the casing when lid 13 is closed as shown in Fig. 1.

If desired, a spray pipe 62 may be mounted across the opposite end of the casing 10 with respect to drain 19 and which may be employed to flush out casing 10.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In a light trap for the passage of prints through a slot in the wall of a darkroom comprising, in combination, a light impervious wall, a slot in said wall, a casing secured to said wall and mounted in said slot and having a portion extending into said darkroom and a portion extending exteriorly thereof, said casing having a closed bottom throughout the length thereof, sides and end portions, a tray mounted for movement from one of said portions to the other of said portions of said casing, a set of rollers pivotally mounted on said tray during said movement, a pair of tracks carried by said sides of the casing upon which said rollers rest a normally locked light-tight lid for said exterior portion and hinged at the wall end thereof for pivotal movement upwardly, latch means operable by movement of said tray when the tray has been moved to said exterior position for holding said lid closed when the tray is out of said exterior portion of the casing, said latch means being operated by the tray when the tray is moved fully into said exterior portion to release the lid, means operable by said lid for preventing movement of said tray when said lid is raised, and light sealing means on said tray for preventing light from entering said darkroom through said slot when the lid is raised.

2. A light trap for use in passing prints from a darkroom comprising, in combination, a wall for said darkroom and having a slot formed therein, a casing mounted in said slot and having a portion extending into said darkroom and a portion extending exteriorly thereof, said casing having a closed bottom and side and end walls, said side walls having tracks mounted thereon and extending substantially the full length thereof, a tray mounted in said casing, said tray having a closed bottom and side and end walls, a plurality of rollers mounted on the side walls of said tray, said rollers being adapted to roll on said tracks whereby said tray is supported for rolling motion in either direction from one of the portions to the other of the portions of said casing, light proofing means surrounding said casing on both sides of said wall, one of the end walls of said tray being provided with light proofing means for preventing the admission of light into said darkroom when the tray has been moved to the exterior portion of the casing, a light proof lid for the exterior portion of the casing, means for locking said lid closed when the tray is out of the exterior portion and to release said lid when said tray is moved fully to the exterior portion, and means for locking the tray against movement out of the exterior portion when said lid is raised.

3. Apparatus for preventing entry of light into a darkroom comprising, in combination, a wall for said darkroom having a slot therethrough, a casing mounted in said slot and having a portion extending into said darkroom and a portion extending exteriorly thereof, a tray mounted in said casing for movement from one of said portions to the other of said portions, a lid for said exterior portion, said lid being light-tight when closed, said tray having light excluding means mounted at one end thereof, said light excluding means being rendered effective when said tray is moved into said exterior portion, means for locking said tray in said exterior portion when said lid is raised, and means for locking said lid in the closed position thereof when said tray is moved from the exterior portion to the darkroom portion and to release said lid when said tray is moved fully to the exterior portion.

4. Work passing apparatus for a darkroom comprising, in combination, a casing having an open end mounted within said darkroom and a closeable end mounted exteriorly of said darkroom, a tray mounted for movement in said casing from one end to the other end thereof, means mounted at one end of said tray for excluding light from said darkroom when the tray is at the closeable end of said casing, a lid mounted on said closeable end for withdrawing the work from said tray and for rendering said casing light-tight when the tray is in the open end thereof, means for locking said tray in place when said lid is raised, and means for locking said lid when said tray is moved toward the open end of said casing and for releasing said lid when said tray is moved fully to the closed end of said casing.

5. Apparatus for excluding light from a darkroom while passing prints therefrom comprising, in combination, a tray for carrying said prints mounted for movement from within said darkroom to the exterior thereof, an enclosure for said tray of sufficient lentgh to permit said movement, a light-tight lid mounted on said enclosure exteriorly of said darkroom, means on said tray for excluding light from said darkroom when said lid is raised, means for preventing raising of said lid when the tray is within the darkroom and for releasing said lid when said tray is moved fully to the exterior portion of said enclosure, and means for preventing movement of said tray when the lid is raised.

6. Apparatus for excluding light from a darkroom while passing prints therefrom comprising, in combination, a tray for carrying said prints, means for supporting said tray for movement from said darkroom to the exterior thereof, an enclosure for said supporting means and said tray, said enclosure being mounted in a wall of said darkroom and having a darkroom portion extending into said darkroom and an exterior portion extending exteriorly thereof, light-tight lid means for the exterior portion of said enclosure, means operable by said tray for locking said lid when the tray is in the darkroom portion of said enclosure and for releasing the lid when the tray is moved fully to said exterior portion of said enclosure, and means operable by said lid for preventing movement of said tray.

References Cited in the file of this patent

UNITED STATES PATENTS

| 544,493 | Wigle | Aug. 13, 1895 |
| 2,373,536 | Burbridge | Apr. 10, 1945 |
| 2,555,631 | Bumstead | June 5, 1951 |

FOREIGN PATENTS

| 313,034 | Great Britain | July 18, 1929 |